United States Patent
Urbain

[15] 3,652,910
[45] Mar. 28, 1972

[54] AUTOMATIC CONTROL DEVICE FOR THE REGENERATION OF ION-EXCHANGE RESINS

[72] Inventor: Jean Louis Urbain, 33 rue du Bierchamps, Marcinelle, Belgium

[22] Filed: Sept. 11, 1969

[21] Appl. No.: 857,143

[30] Foreign Application Priority Data

June 18, 1969 Belgium...............................75,521
Sept. 23, 1968 Belgium.............................721,240

[52] U.S. Cl................................318/445, 307/116, 210/96
[51] Int. Cl. ..................................B01d 15/04, B01d 15/06
[58] Field of Search ....................307/116, 118, 130; 210/96, 210/14; 318/445

[56] References Cited

UNITED STATES PATENTS

| | | | |
|---|---|---|---|
| 3,159,573 | 12/1964 | Ritchie | 210/96 |
| 3,182,227 | 5/1965 | Brittain et al. | 307/132 X |
| 3,246,180 | 4/1966 | Keeney, Jr. | 307/118 |
| 3,246,759 | 4/1966 | Matalon | 210/96 |

Primary Examiner—J. D. Miller
Assistant Examiner—Robert J. Hickey
Attorney—Wenderoth, Lind & Ponack

[57] ABSTRACT

A device for automatically controlling the regeneration of an ion-exchange resin. Two pairs of electrodes are spaced in the resin, one above the other. A variation in capacitance or resistance between the pairs, due to change in ion content of the resin actuates a relay which initiates regenerization. A diode and a strong capacitor retard the relay to avoid the accumulation of false information.

6 Claims, 2 Drawing Figures

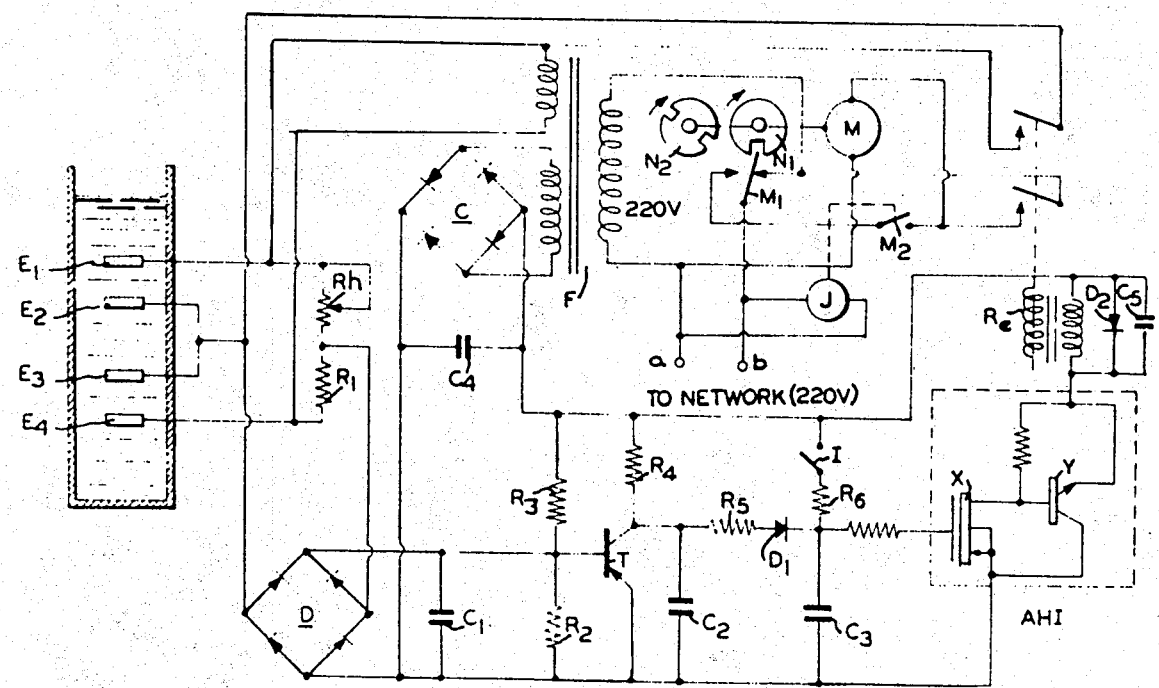

AUTOMATIC CONTROL DEVICE FOR THE REGENERATION OF ION-EXCHANGE RESINS

The present invention relates to an automatic control device for the regeneration of ion-exchange resins, and it principally concerns an electronic control device for apparatus incorporating ion-exchange resins, such as those used for the softening of water.

In such apparatus, the liquid from which it is desired to eliminate one or more ions flows through an ion-exchange resin, judiciously chosen so that an exchange of ions between the liquid and the resin takes place. There are numerous applications of this technique, notably in softening water. In that case, the resin is charged with sodium ($Na^+$) ions and is permeated by water to be purified, whereby exchange between the ions (mainly calcium ($Ca^{++}$) ions) in the water and the sodium ions in the resin takes place. The latter thus progressively becomes charged with the calcium ions and must be regenerated to be used again. Regeneration is produced by washing the calcium ion charged resin with a solution charged with sodium ions, such as sodium chloride solution.

The present invention thus has for its object to provide an automatic control device for such regeneration of ion-exchange resins, charged with ions collected from a liquid in the course of purification. In order to simplify the description, reference will be made hereafter to the case of water softening, that is the elimination of calcium ions from the water by exchange with sodium ions from the resin, it being understood that the invention is applicable to all cases of purification of liquids by passage through ion-exchange resins.

It is obviously of interest that the regeneration of the resin can be carried out automatically, since the resin has lost an important part of its activity. The devices used so far to achieve such automation are based upon measurement of the difference between the electrical conductivity of the pure water and of the fresh resin, on one hand, and the electrical conductivity of the untreated water and the calcium ion charged resin, on the other hand. For this purpose, electrodes are introduced at different heights from the bed of resin and the resistance between the electrodes measured. This resistance, which is proportional to the activity of the resin and the degree of purification of the water, allows automatic control of regeneration.

Another control technique for the regeneration of ion-exchange resin consists of adapting a timing device to the apparatus. This timing device initiates regeneration after a determined time lapse and for a duration necessary for the exchange of ions.

Another method consists of combining a timing device and the variation in capacity of condensers formed by the resins and electrodes located in the midst of the resin, and the timing device acts only when the resin needs to be regenerated, that being controlled by the variation in capacitance.

Many automatic control devices based on these principles are known, but they are not entirely satisfactory.

In fact, it often happens that the resin is not disposed in the purifier as an absolutely homogenous bed, but with preferential routes or passages for the water. In other cases, ionic flows may be produced above all in the case of high rates of flow of water. It thus happens that the electrodes detect saturation of the resin with calcium ions, long before such saturation has been achieved. This detection is registered and regeneration of the resin commenced on the basis of false information.

On the other hand, in the case of abnormally high water consumption, regeneration of the resin takes place relatively soon after the previous regeneration. The space of time between the successive regenerations cannot be sufficient for the formation of a solution properly saturated with sodium ions. In consequence, the calcium ion charged resin is washed by a sodium salt solution which is too dilute, and the resin is not regenerated. The result is that after passage of the solution, the detector functions immediately thereafter, and the washing cycle takes place once more so that all the time is taken up with regeneration.

The present invention has for its object to remedy these different defects and to assure efficient regeneration of the ion-exchange resin.

According to the present invention, an automatic control device for the regeneration of ion-exchange resins by the passage of a liquid therethrough comprises essentially two pairs of electrodes introduced one below the other in a bed of the resin, a threshold amplifier to amplify the voltage due to the variation in detection of electrical properties at the level of the two pairs of electrodes a regeneration control relay, the actuation of which is caused by the amplifier, a diode and a strong capacitance retarding the moment of actuation of the relay, the diode avoiding accumulation of false information.

The two pairs of electrodes, located one below the other in the bed of resin are in the presence of a medium constituted by the ion-exchange resin and water. As the resin gives up its sodium ions to the water and fixes calcium ions from the latter, the medium at the level of the upper pair of electrodes is different from the medium at the level of the lower pair of electrodes. This difference gives rise to a variation in the relationship between the electrical properties of these two media. Thus, the variation of the relationship between the resistance of the first pair of electrodes and the resistance of the second pair of electrodes is used as the principle of detection.

But one could also, following another variant of the present invention, use each pair of electrodes assembled into rigid unit to provide a condenser where the water and the resin between the electrodes of each pair are dielectric; in this case, the variation of capacitance is used as the principle of detection.

Other characteristics of the present invention will become apparent from the following description of two embodiments of the invention illustrated in the accompanying drawings wherein:

FIG. 1 shows two pairs of electrodes and a circuit diagram of a control circuit for the regeneration of a resin; and FIG. 2 shows two electrolytic condensers for association with the same electrical circuit as in FIG. 1.

The apparatus used (not shown) for softening water is filled with an ion-exchange resin, which gives up its sodium ions to water and fixes calcium ions from the water. Regeneration of the resin must take place when it contains no more exchangeable ions of sodium and is practically saturated with calcium ions.

According to FIG. 1, the instant at which the resin has lost the greater part of its effectiveness is determined by using two pairs of electrodes $E_1$, $E_2$ on one hand and $E_3$, and $E_4$ on the other hand which are introduced into the resin. The pair $E_1$, $E_2$ is placed above the pair $E_3$, $E_4$. These electrodes are supplied with alternating current, to avoid a polarizing effect. Electrode $E_4$ is introduced at a level such that the quantity of resin located therebelow is sufficient for a normal determined consumption, for example a normal day's consumption. On the other hand, the resin is charged with calcium ions in successive layers, that is the exchange of its ions with those of the water proceeds from the summit of the resin bed, takes place first in the upper layer of the resin, then that layer having been exhausted, the layers located therebelow are successively acted upon. The electrode $E_4$ must not therefore be introduced into the upper part of the resin otherwise it will detect exhaustion of the resin long before it is completely exhausted. The distance between the electrodes $E_1$, $E_2$ is identical to that between the electrodes $E_3$, $E_4$ but the distance between the electrodes $E_2$ and $E_3$ is much greater. The distance may be determined as a function of the flow rate of the water and of the diameter of the apparatus containing the resin.

When the resin is practically void of calcium ions, that is when it is fresh or has just been regenerated, the resistance formed by electrodes $E_1$, $E_2$ and that formed by electrodes $E_3$, $E_4$ has a determined value, but the relationship between the two resistances is invariable. However, when the resin at the level of the electrodes $E_1$, $E_2$ has exchanged its sodium ions for calcium ions from the water, the relationship of these resistances varies. To detect this variation, as is known, a Wheatstone bridge is formed with a resistance R of the electrodes $E_1$, $E_2$ designated by $R(E_1, E_2)$, the resistance R of electrodes $E_3$, $E_4$ by $R(E_3, E_4)$, a resistor $R_1$ and a potentiometer Rh. In this way, when resistance $R(E_1, E_2)$ varies, it produces instability in the bridge.

This instability is very feeble and the voltage delivered is only a few millivolts. The voltage is balanced by rectifier bridge D and integrated by a capacitor $C_1$.

A divider bridge formed by resistance $R_2$ and $R_3$ at the base of Transistor T determines a saturation current on the collector thereof. The voltage of the latter is thus very weak. The integrated voltage counters the bridge $R_2$, $R_3$. When this integrated voltage is sufficient the collector current leaves the transistor T. At this moment the voltage is a maximum at the collector of Transistor T. This voltage is integrated by diode $D_1$, capacitor $C_3$, and resistance $R_5$.

These elements are provided to avoid all premature regenerations of the resin, due for example to an ionic stream or the presence of preferential routes for the water through the bed of resin. These elements create a time constant, that is a delay between detection and regeneration.

Notably there is used a strong capacitor $C_3$, and a diode $D_1$. This diode $D_1$ is nonconductive and acts as a resistor during the charging of capacitor $C_3$. The voltages integrated to the terminals of $C_3$ attacks a threshold amplifier of very high impedance, AHI, which itself controls a relay $R_e$. High impedance amplifier AHI comprises a first transistor X, a second transistor Y and requisite resistors as is known. As soon as the voltage on the terminals of $C_3$ attains the threshold of the amplifier, the relay $R_e$ closes, sending on one hand an alternating holding current to the bridge rectifier D and on the other hand, the alternating current of the network to the motor M which is provided with a speed reducer. From this moment, motor M runs and, with the cam $N_1$, closes the microswitch $M_1$, which breaks the current to the detection circuit and stops rotation of the motor M. On the other hand, the microswitch $M_1$ sends current from the network to the microswitch $M_2$ which reestablishes supply to motor M at the time chosen for regeneration. The microswitch $M_2$ is controlled by a rotating timing device J.

A cam $N_2$ of the motor M controls the cycles of a hydraulic vane so that, the cam having made one complete turn, the resin is regenerated. The microswitch $M_1$ returns to its initial position and the electronic circuit is once more completed. A network of 220 volts connects to the circuit at a, b. C is a rectifier bridge which rectifies voltage of 220 volts delivered from transformer F.

The periods of regeneration can be spaced in time as a function of the least time required for the preparation of a saturated aqueous solution of a sodium salt for the use of the regeneration of the resin. This minimum period is thus also the least period between two regenerations for which the timing device J is adapted.

In certain cases, water can imprint certain preferred routes through the resin. It arrives therefore in contact with the electrodes $E_1$, $E_2$ without having exchanged its calcium ions for sodium ions from the resin. As a result, the pair of electrodes $E_1$, $E_2$ indicates that the sodium ions are exhausted from the resin. But this detection is not transmitted directly to the relay $R_e$, due to the presence of diode $D_1$ acting as a resistance and the strong capacitor $C_3$, that is due to the time constant; and water having followed the preferred route, arrives at the electrodes $E_3$, $E_4$ before the relay has closed. In consequence, the two pairs of electrodes are in the presence of the same quality of water, and the relationship between the resistance $R(E_1, E_2)$ and $R(E_3, E_4)$ remains normal, and Wheatstone bridge remains balanced. Therefore, regeneration is not initiated.

If instead of diode $D_1$, a linear resistance were used, there would be a risk of the relay closing prematurely. In fact, by using a linear resistance and taking into account the time constant, the discharge of capacitor $C_3$ will be very slow. If during the discharge, the consumption of water is halted, the electrodes $E_1$, $E_2$, $E_3$, $E_4$ are once more in the presence of water not containing calcium ions. When consumption again starts, the two pairs of electrodes will be in the presence of different qualities of water and capacitor $C_3$ will again be charged. Now this capacitor not having been completely discharged, there will be an accumulation of voltage. If the cycle is repeated, the voltage will eventually reach the amount required to close the relays through the amplifier AHI.

Using a diode $D_1$ instead of a linear resistance, this accumulation of voltage is avoided. When the discharge of capacitor $C_3$ takes place, diode $D_1$ becomes conductive and the discharge is very rapid. It takes place across the transistor T with use of resistance $R_5$ to limit the current and protect the transistor.

A commutator switch I is also provided which allows special regeneration at any desired time. Due to this commutator, a negative supply voltage is sent across resistance $R_6$ to capacitor $C_3$ which actuates relay $R_e$ and starts regeneration.

The circuit controlling regeneration as a function of the detection carried out by the two pairs of electrodes also comprises other elements, such as a diode $D_2$ protecting the amplifier AHI, a stabilizing condenser $C_5$ for avoiding trembling of the relay $R_e$, a filter $C_4$ in the supply to the transistors, and a capacitor $C_2$ for avoiding alternate current on the diode $D_1$.

The mechanical registration of the detection remedies all failures of the electric supply network. In fact, if the detection takes place for example very early in the morning, and regeneration is not required until the following night, a very long time separates the two functions and it is necessary for the detection to be kept up during that time. But the detection is not useful if consumption of water continues.

If a suspension of electrical power takes place during a period such that the consumption of water may have been significant, no detection will take place until the current is restored. In fact, the electrodes will be in the presence of resin saturated with calcium ions and impure water, with no difference in electrical conductivity. The resin is exhausted and detection will not take place. On the contrary, if the detection is registered by a mechanical device, a current stoppage produced after the detection cannot delay regeneration from the chosen time until the reestablishment of the current supply.

FIG. 2 represents another mode of carrying out the invention wherein electrolytic condensers are used. The water and the bed of resin constitute a dielectric.

The value of the capacitance is a function of the surface area of the condensers, of the distance therebetween and of the dielectric. The latter presents different values as a function of the state of the ion-exchange resin.

Condensers $A_1$ and $A_2$ are connected in series and supplied by an alternating current U delivered through a transformer. The current which crosses the condensers $A_1$ and $A_2$ is identical as they are connected in series. The value of this current depends upon the values of the impedance and frequency of $Z_1$ and $Z_2$. This current is out of phase with the current U by a certain value, this value depending on $Z_1$ and $Z_2$, that is on the capacitance and on the resistance of $A_1$ and $A_2$. The potential of junction point O' of the two impedances $Z_1$, $Z_2$ thus has a value and a phase determined by reference to point O.

In order to compensate for the stray capacitances of the wiring of the probe and for inequalities of manufacture of the condenser, the point O is constituted by a potentiometer, to obtain a more precise regulation. This potentiometer comprises a resistance and a rheostat.

The circuit has the appearance of a Wheatstone bridge, its function being to balance the points O and O' in voltage and in phase.

When water and the ion-exchange resin are charged principally with calcium ions at the level of condenser $A_1$ the impedance thereof varies, this variation being principally due to the resistance to leakage.

It is notable that the leakage resistance has only a weak incidence with reference to the variation in capacitance; on the other hand, as soon as the electrodes are oxidized, the leakage resistance is very high, the variation very weak, and only the variation in capacitance may be satisfactorily determined. This peculiarity permits the use of any metal for the condensers, and enables the apparatus to be as sensitive as new for several years.

The variation of the relationship of the impedance produces an imbalance of the bridge, and the voltage as a result is compensated (rectifier bridge D) and integrated (capacitor $C_1$) as in the case of the embodiment of FIG. 1, since the same means of amplification and control of regeneration is used.

Other modifications and additional components may be used in the devices described hereinabove without departing from the scope of the invention, of which the principal advantages are a small power consumption, reliability in use, and efficiency.

What is claimed is:

1. An automatic control device for the regeneration of an ion-exchange resin, said device comprising two pairs of electrodes positioned within a bed of said resin, a first of said pairs being positioned upstream of the other of said pairs; a Wheatstone bridge detection circuit, the four legs of which respectively comprise said first pair of electrodes, said second pair of electrodes, a rheostat and an auxiliary resistance, said detection circuit adapted to produce a voltage when the electrical properties of said resin at the levels of said pairs of electrodes differ; a threshold amplifier connected to amplify said voltage; a relay operable in response to said amplified voltage; a motor for operating said regeneration and selectively actuated by said relay; a diode and capacitor means associated with said amplifier and relay for retarding the operation of said relay and thereby selectively delaying the commencement of said regeneration, said capacitor being charged by the low inverse current of said diode and thus having a low charge, and said diode being conductive when the discharge of said capacitor takes place, said diode further adapted to avoid accumulation of false information; a cam mounted on said motor and movable when said motor operates; a first microswitch adapted to be closed by said cam when said motor rotates, a second microswitch and a rotating timing device, said first microswitch when closed adapted to break current to said detection circuit and thereby stop the operation of said motor, but also adapted to send current through said second microswitch by means of said rotating timing device whereby said motor is again operated.

2. A device according to claim 1 characterized in that the distance between said two pairs of electrodes is greater than the distance separating said electrodes of each pair.

3. A device according to claim 1, further comprising a bridge rectifier to rectify said voltage and a capacitor to integrate the rectified voltage.

4. A device according to claim 1 characterized in that the resistance formed by one pair of said two pairs of electrodes, the resistance formed by the other pair of said two pairs of electrodes, said rheostat and said auxiliary resistance form said four legs of said Wheatstone bridge, to create said voltage in the case of variation of the relationship between the resistances of said pairs of electrodes.

5. A device according to claim 1 characterized in that the two electrodes of each pair of electrodes are assembled into a rigid unit providing a condenser where the water and the resin between the electrodes of each pair are the dielectric.

6. A device according to claim 5, characterized in that the capacitance formed by one of said condensers, the capacitance formed by the other of said condensers, said rheostat and said auxiliary resistance form said four legs of said Wheatstone bridge, to create said voltage in the case of variation in the relationship between the impedance of said one condenser and the impedance of the said other condenser.

* * * * *